United States Patent

Rose et al.

[11] Patent Number: 5,732,283
[45] Date of Patent: Mar. 24, 1998

[54] SYSTEM AND METHOD OF PROVIDING UNIVERSAL SUPPORT FOR MULTIPLE POINTING DEVICES

[75] Inventors: Robert A. Rose, Delray Beach; Joseph Celi, Jr., Boynton Beach, both of Fla.

[73] Assignee: International Business Machines Corporation, Armonk, N.Y.

[21] Appl. No.: 547,355

[22] Filed: Oct. 24, 1995

[51] Int. Cl.⁶ .................................................. G06F 15/02
[52] U.S. Cl. .................... 395/836; 395/821; 395/882; 395/893; 395/652; 345/163
[58] Field of Search .................... 395/821, 836, 395/893, 653, 178, 112, 882, 683, 175; 348/156–184

[56] References Cited

U.S. PATENT DOCUMENTS

| | | | |
|---|---|---|---|
| 4,803,623 | 2/1989 | Klashka et al. | 395/828 |
| 4,805,090 | 2/1989 | Coogan | 395/894 |
| 4,855,905 | 8/1989 | Estrada et al. | 395/500 |
| 4,860,200 | 8/1989 | Holmbo | 395/742 |
| 4,875,186 | 10/1989 | Blume, Jr. | 395/500 |
| 4,901,223 | 2/1990 | Rhyne | 395/175 |
| 5,161,222 | 11/1992 | Montejo et al. | 395/500 |
| 5,165,014 | 11/1992 | Vassar | 395/112 |
| 5,276,816 | 1/1994 | Cavendish et al. | 395/348 |
| 5,317,695 | 5/1994 | Celi, Jr. | 395/836 |
| 5,355,148 | 10/1994 | Anderson | 345/166 |
| 5,404,458 | 4/1995 | Zetts | 395/893 |
| 5,404,524 | 4/1995 | Celi, Jr. | 395/652 |
| 5,608,895 | 3/1997 | Lee | 395/500 |
| 5,633,657 | 5/1997 | Falcon | 345/145 |
| 5,638,092 | 6/1997 | Eng et al. | 345/158 |

*Primary Examiner*—Christopher B. Shin
*Attorney, Agent, or Firm*—Mark S. Walker; Jack V. Musgrove; Andrew J. Dillon

[57] ABSTRACT

A system and means for selecting a proper protocol for a pointing device used in a computer system having a data store, a main processing unit, data input and output means, is disclosed. The selecting means includes means, coupled to the pointing device, for analyzing a data stream from the pointing device; means, coupled to the analyzing means, for determing a protocol based on the analyzed data stream; and means, coupled to the determing means, for selecting a device state from a plurality of device states for enabling the pointing device to operate in the computer system.

18 Claims, 6 Drawing Sheets

SYSTEM AND METHOD OF PROVIDING UNIVERSAL SUPPORT FOR MULTIPLE POINTING DEVICES

BACKGROUND OF THE INVENTION

1. Technical Field

This present invention relates, generally, to a method for use in a data processing system for providing support to a particular pointing device and, more particularly, to providing universal support to any pointing device selected for a data processing system.

2. Description of the Related Art

Pointing device protocols are well known in the arts. Currently, there are three different standards of reporting protocols used in the pointing device field. Accordingly, current operating systems require at least three different drivers for each of these protocols. Further, a particular pointer added to a data processing system must have the proper driver selected or configured before operation.

Since a universal pointing device selection protocol does not exist, each processing system that attempts to support three different pointing devices available, must include all three drivers for each of the pointing devices. Additionally, since the configuration must be done proactively by the user, some confusion occurs during the installation. The need for the three different types of drivers requires more disk space on both the shipping media and the user's hard drive.

Accordingly, what is needed is a universal pointing device driver that supports all standard pointing device protocols currently used and that is automatic in selection and detection, as well as having error detection capabilities.

SUMMARY OF THE INVENTION

It is therefore one object of the present invention to provide a method for use in a data processing system for providing support to a particular pointing device.

It is another object of the present invention to provide universal support to any pointing device selected for a data processing system.

It is yet another object of the present invention to provide a universal autodetection pointing device driver that selects a particular pointing device protocol among various types of device protocols utilized in a data processing system and having error detection, if necessary.

The foregoing objects are achieved as is now described. According to the present invention, a system and means for selecting a proper protocol for a pointing device used in a computer system having a data store, a main processing unit, data input and output means, is disclosed. The selecting means includes means, coupled to the pointing device, for analyzing a data stream from the pointing device, means, coupled to the analyzing means, for determing a protocol based on the analyzed data stream; and means, coupled to the determing means, for selecting a device state from a plurality of device states for enabling the pointing device to operate in the computer system.

The plurality of device states includes a point 3 state for a two-button pointing device, a point 4 state for a three-button pointing device, and a point 5 state. The point 4 state is determined by the action of a third button on the pointing device. Further, the analyzing means includes means for determining a probation state to prevent a protocol change in the event of detected errors that do not require a protocol change for the pointing device.

The above as well as additional objects, features, and advantages of the present invention will become apparent in the following detailed written description.

DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction wit the accompanying drawings, wherein:

DETAILED DESCRIPTION OF THE INVENTION

Figure 1:
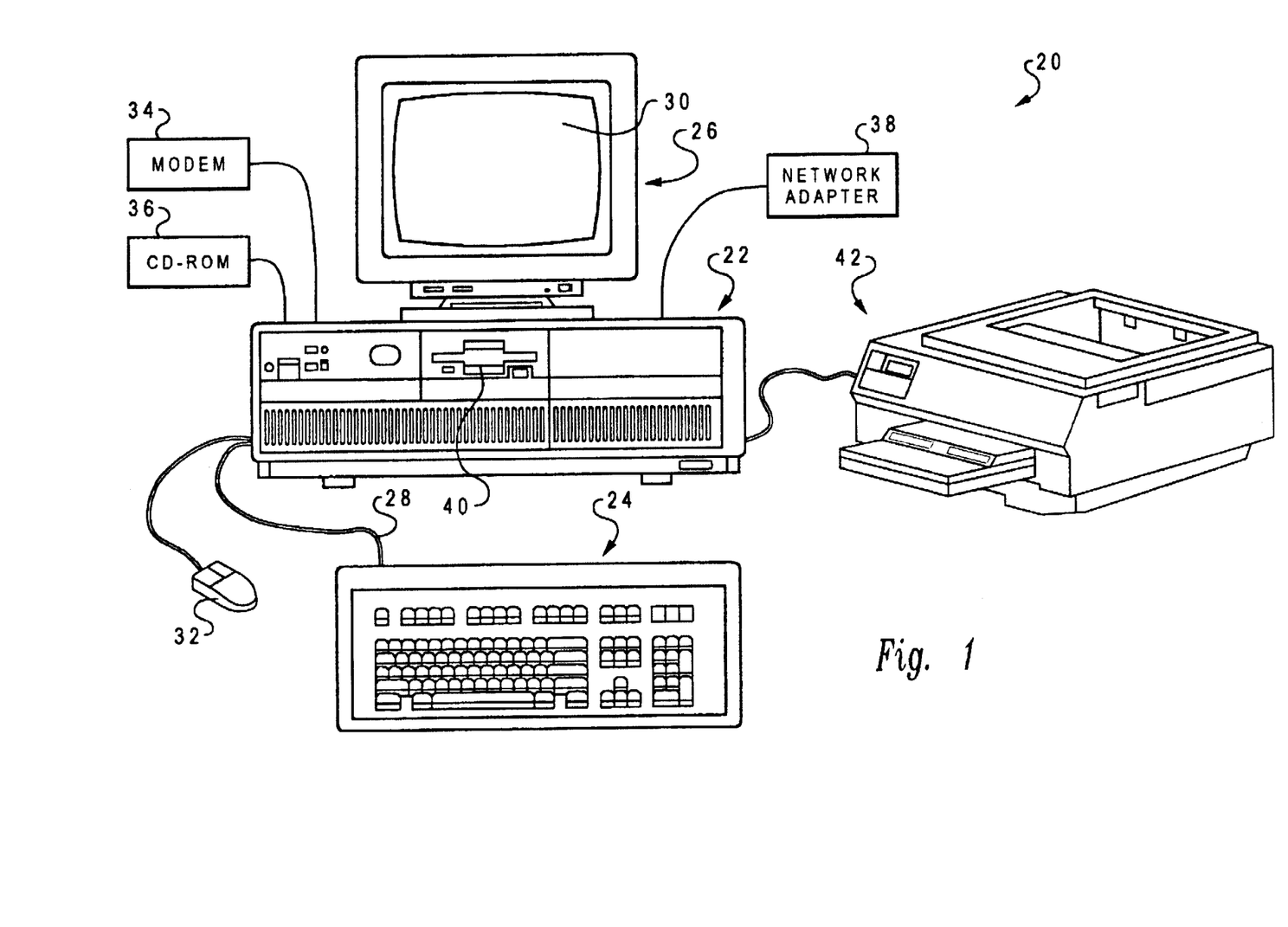
FIG. 1 depicts a data processing system in accordance with the method and system of the present invention.

With reference now to the figures, and in particular to FIG. 1, there is depicted a data processing system 20, which includes processor 22, keyboard 24, and display 26. Keyboard 24 is coupled to processor 22 by a cable 28. Display 26 includes display screen 30, which may be implemented utilizing a cathode ray tube (CRT), a liquid crystal display (LCD), an electroluminescent panel, or the like. Data processing system 20 also includes pointing device 32, which may be implemented utilizing a track ball, joystick, touch sensitive tablet or screen, trackpad, or as illustrated in FIG. 1, a mouse. Pointing device 32 may be utilized to move a pointer or cursor on display screen 30. Processor 22 may also be coupled to one or more peripheral devices, such as modem 34, CD-ROM 36, network adaptor 38 and floppy disk drive 40, each of which may be internal or external to the enclosure of processor 22. An output device such as printer 42 may also be coupled to processor 22.

Those persons skilled in the art of data processing system design should recognize that display 26, keyboard 24, and pointing device 32 may each be implemented utilizing any one of several known off-the-shelf components. Data processing system 20 may be implemented utilizing any general purpose computer or so-called personal computer, such as the personal computer sold under the trademark "PS/2" by International Business Machines Corporation (IBM), of Armonk, N.Y.

Figure 2:
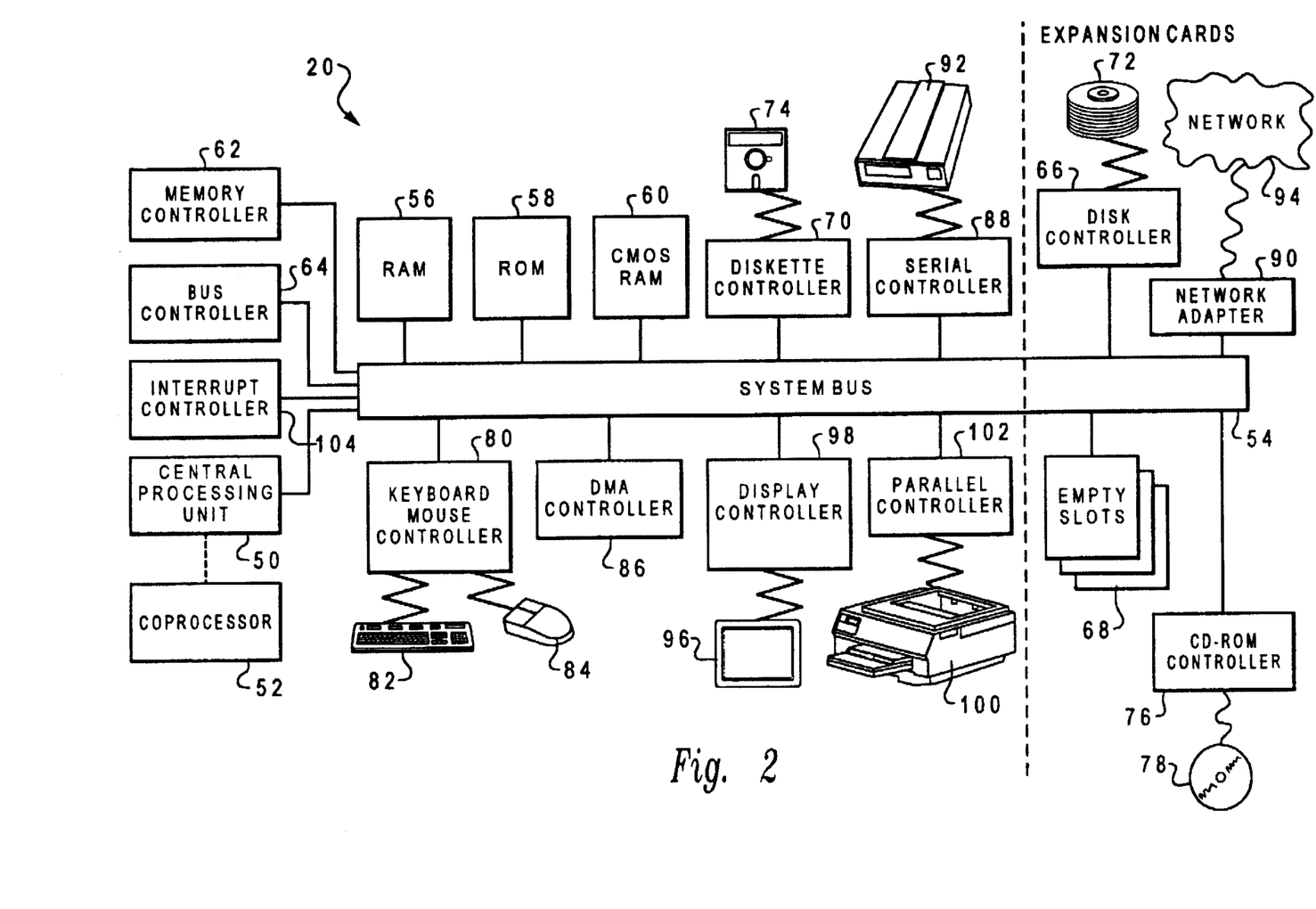
FIG. 2 is a more detailed high-level block diagram which further illustrates the major components of the data processing system of FIG. 1.

With reference now to FIG. 2, there is depicted a high-level block diagram which further illustrates the major components that may be included in data processing system 20 of FIG. 1. Data processing system 20 is controlled primarily by computer readable instructions, which may be in the form of software, wherever, or by whatever means such software is stored or accessed. Such software may be executed within central processing unit (CPU) 50 to cause data processing system 20 to do work. In many known workstations and personal computers, such as the personal computer sold by IBM under the trademark "PS/2," central processing unit 50 is implemented by a single-chip CPU called a microprocessor. Examples of such microprocessors include the microprocessor sold under the trademark "PENTIUM" by Intel Corporation and the microprocessor sold under the trademark "PowerPC" by International Business Machines Corporation.

Coprocessor 52 is an optional processor, distinct from main CPU 50, that performs additional functions or assists CPU 50. One common type of coprocessor is the floating-point coprocessor, also called a numeric or math coprocessor, which is designed to perform numeric calculations faster and better than general-purpose CPU 50. Recently, however, the functions of many coprocessors have been incorporated into more powerful single-chip microprocessors.

CPU 50 fetches, decodes, and executes instructions, and transfers information to and from other resources via the computer's main data-transfer path, system bus 54. Such a system bus connects the components in data processing system 20 and defines the medium for data exchange. System bus 54 typically includes data lines for sending data, address lines for sending addresses, and control lines for sending interrupts and for operating the system bus. An example of such a system bus is the PCI (Peripheral Component Interconnect) bus and the bus sold under the trademark "Micro Channel Architecture" by IBM. The Micro Channel Architecture provides a function called bus arbitration that regulates access to the bus by extension cards, controllers, and CPU 50. Devices that attach to the Micro Channel and arbitrate to take over the bus are called bus masters. Bus master support also allows multiprocessor configurations of the Micro Channel to be created by the addition of bus master adapters containing a processor and its support chips.

Memory devices coupled to system bus 54 include random access memory (RAM) 56, read only memory (ROM) 58, and nonvolatile memory 60. Such memories include circuitry that allows information to be stored and retrieved. ROMs contain stored data that cannot be modified. Data stored in RAM can be read or changed by CPU 50 or other hardware devices. Nonvolatile memory is memory that does not lose data when power is removed from it. Nonvolatile memories include ROM, EPROM, flash memory, bubble memory, or battery-backed CMOS RAM. As shown in FIG. 2, such battery-backed CMOS RAM may be utilized to store system configuration information.

Access to RAM 56, ROM 58, and nonvolatile memory 60 may be controlled by memory controller 62 and bus controller 64. Memory controller 62 may provide an address translation function that translates virtual addresses into physical addresses as instructions are executed. Memory controller 62 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

An expansion card or expansion board is a circuit board that includes chips and other electronic components connected in a circuit that adds functions or resources to the computer. Typical expansion cards add memory, disk-drive controllers 66, video support, parallel and serial ports, and internal modems. For laptop, palmtop, and other portable computers, expansion cards usually take the form of PC Cards, which are credit card-size devices designed to plug into a slot in the side or back of a computer. An example of such a slot is the PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special-purpose integrated circuits and associated circuitry that direct and control reading from and writing to a hard disk drive 72 and a floppy disk or diskette 74, respectively. Such disk controllers handle tasks such as positioning read/write head, mediating between the drive and the microprocessor, and controlling the transfer of information to and from memory. A single disk controller may be able to control more that one disk drive.

CD-ROM controller 76 may be included in data processing 20 for reading data from CD-ROMs 78 (compact disk read-only memory). Such CD-ROMs use laser optics rather than magnetic means for reading data.

Keyboard mouse controller 80 is provided in data processing system 20 for interfacing with keyboard 82 and a pointing device, such as mouse 84. Such pointing devices are typically utilized to control an on-screen element, such as a cursor, which may take the form of an arrow having a hot spot that specifies the location of the pointer when the user presses a mouse button. Other pointing devices include the graphics tablet, the stylus, the light pen, the joystick, the puck, the trackball, the trackpad and the pointing device sold under the trademark "TrackPoint" by IBM.

Direct memory access (DMA) controller 86 may be used to provide a memory access that does not involve CPU 50. Such memory accesses are typically employed for data transfer directly between memory and an "intelligent" peripheral device, such as between memory 56 and disk controller 66.

Communication between data processing system 20 and other data processing systems may be facilitated by serial controller 88 and network adaptor 90, both of which are coupled to system bus 54. Serial controller 88 is utilized to transmit information between computers, or between a computer and peripheral devices, one bit at a time over a single line. Serial communications can be synchronous (controlled by some time standard such as a clock) or asynchronous (managed by the exchange of control signals that govern the flow of information). Examples of serial communications standards include the RS-232 interface and the RS-422 interface.

As illustrated, such a serial interface may be utilized to communicate with modem 92. A modem is a communications device that enables a computer to transmit information over a standard telephone line. Modems convert digital computer signals to analog signals suitable for communication over telephone lines. Modem 92 may be utilized to connect data processing system 20 to an on-line information service, such as the information service provided under the service mark "PRODIGY" by IBM and Sears. Such on-line service providers may offer software which may be downloaded into data processing system 20 via modem 92. Modem 92 may provide a connection to other sources of software, such as a server, an electronic bulletin board, and the Internet or World Wide Web.

Network adaptor 90 may be used to connect data processing system 20 to a local area network 94. Network 94 may provide computer users with means of communicating and transferring software and information electronically. Additionally, network 94 may provide distributed processing, which involves several computers and the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with a CRT-based video display, an LCD-based flat-panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as a transparency. Other types of printers may include an imagesetter, a plotter, or a film recorder.

Parallel controller 102 is used to send multiple data and control bits simultaneously over wires connected between system bus 54 and another parallel communication device, such as printer 100. The most common parallel interface is the Centronics interface.

During data processing operations, the various devices connected to system bus 54 may generate interrupts which are processed by interrupt controller 104. An interrupt is a request for attention from CPU 50 that can be passed to CPU 50 by either hardware or software. An interrupt causes the microprocessor to suspend currently executing instructions, save the status of the work in progress, and transfer control to a special routine, known as an interrupt handler, that causes a particular set of instructions to be carried out. Interrupt controller 104 may be required to handle a hierarchy of interrupt priorities and arbitrate simultaneous interrupt requests. Interrupt controller 104 may also be used to temporally disable interrupts.

The operating system provides for a single driver that supports all three standard protocols used in selecting device drivers for pointing devices. Further, the system has an autodetection feature, which automatically detects the appropriate protocol for the attached pointing device. Also, the device driver is able to communicate with pointing devices that use either 7-E-1 or 8-N-1 communication sequence without reprogramming the serial UART.

Figure 3:
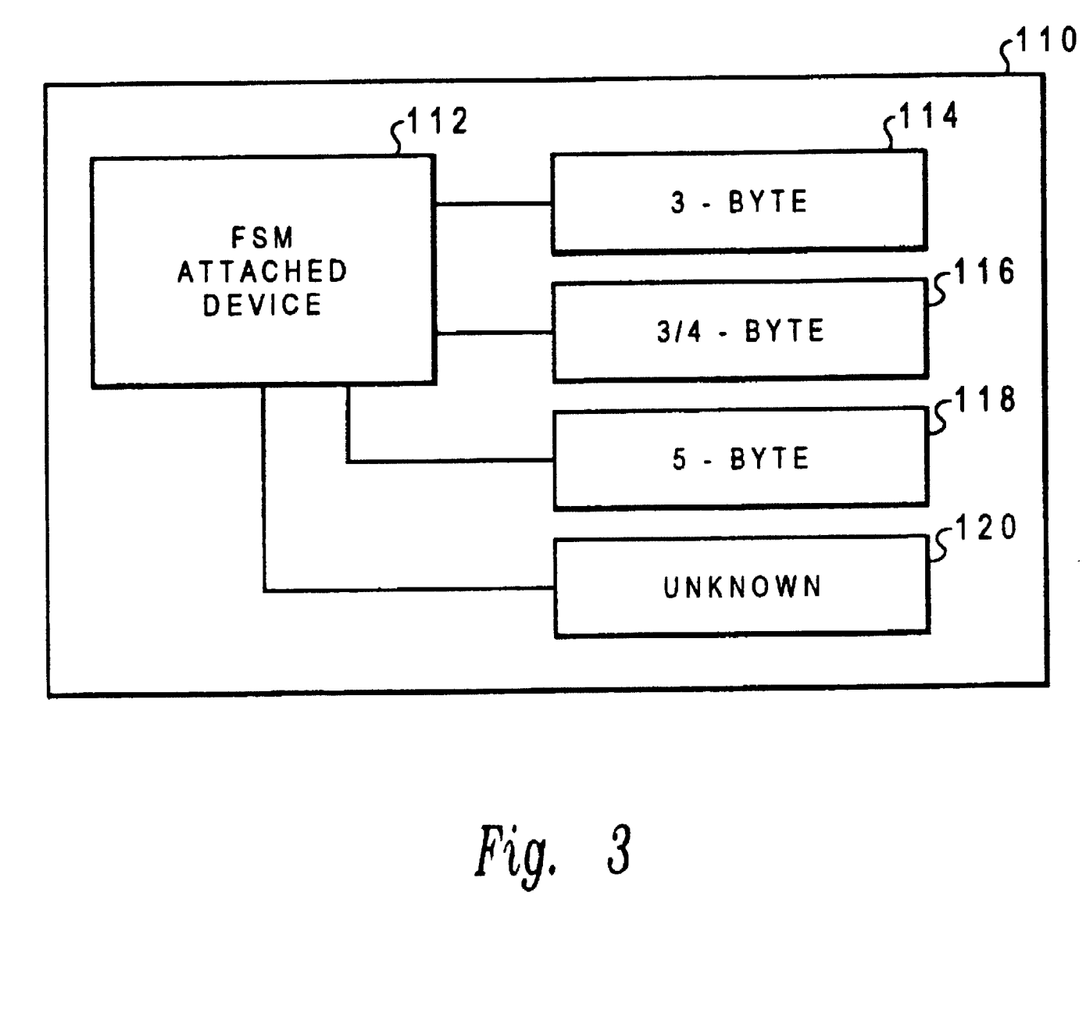
FIG. 3 is a block diagram illustrating a series of nested finite state machines (FSMs) implemented in the present invention.

FIG. 3 is a block diagram illustrating a series of nested finite state machines (FSMs) 110 implemented in the present invention for performing the automatic universal pointing device selection protocol. The outermost state machine 112 correspond to the protocol of the attached device, whether it be a 3-byte 114, ¾-byte 116, 5-byte 118 or Unknown 120. Each of the protocols has an associated sub-FSM dedicated to processing its protocol except for the 3-byte and ¾-byte protocols, which share the majority of their sub-FSMs. Autodetection of the attached pointing device protocol is done within the "Unknown" state. Of note, the nesting of FSMs is a preferred implementation, but the same technique may be accomplished using a different arrangement of states or variables, or both.

For background with respect to the pointing device communication protocols, the following is given. Conventional pointer drivers support either a 7-bit-even-parity-1 stop serial communications, such as the Microsoft 3-byte and Logitech ¾-byte protocols, or an 8-bit-no-parity-1 stop communications, such as the Mouse System's 5-byte protocol and the Logitech emulation of the Mouse System's protocol. The universal selection implementation described herein programs the hardware system device driver to communicate at 8-N-1 and takes special precautions when communicating with 7-E-1 devices.

Figure 4:
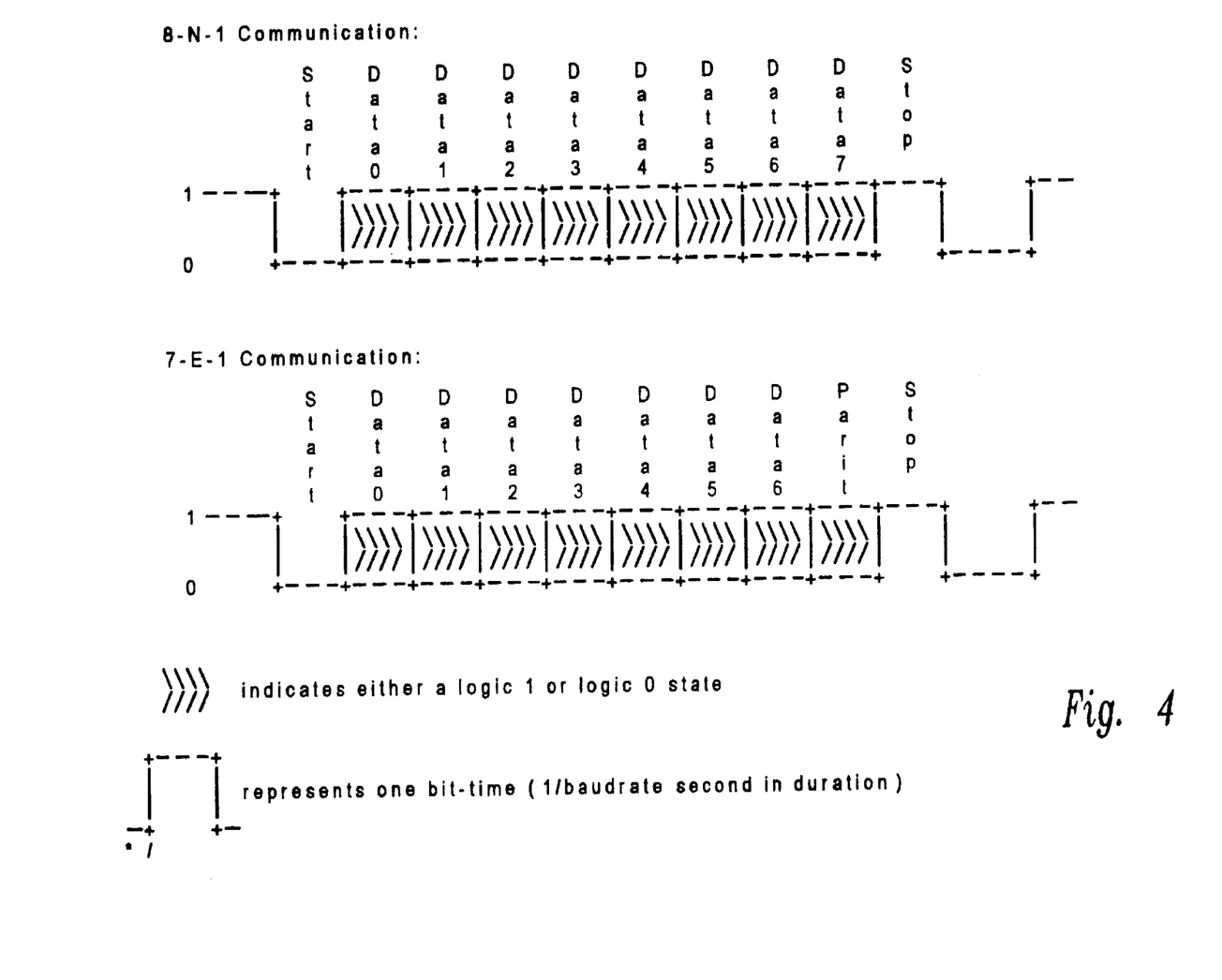
FIG. 4 illustrates the serial communications pattern in both the 7-E-1 devices and the 8-N-1 devices.

FIG. 4 illustrates the serial communications pattern in both the 7-E-1 devices and the 8-N-1 devices. The parity bit transmitted with 7-bit devices masquerades as the eighth data bit so that an AND statement can be used to clear that bit and effectuate communication with 7-E-1 devices over an 8-N-1 channel.

Figure 5:
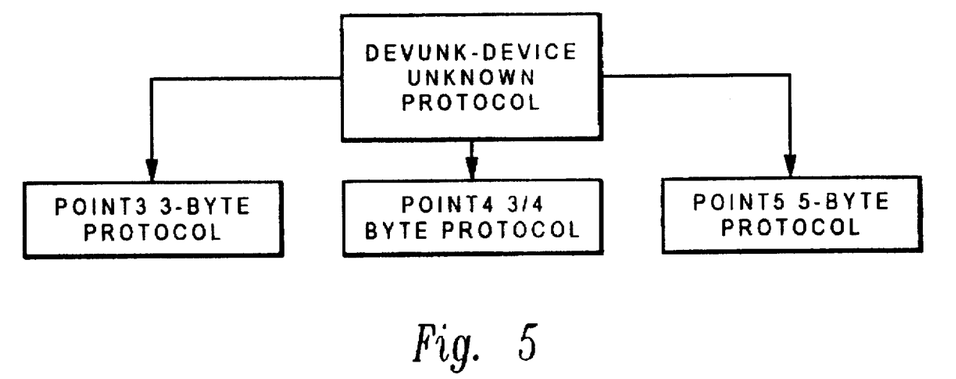
FIG. 5 illustrates a flow diagram of the outermost first level FSM.

FIG. 5 illustrates a flow diagram of the outermost first level FSM, which consists of four states relating to the type of attached pointing device. The system begins operation in the DEVUNK or device-unknown state, which attempts to analyze the device data stream and determine the protocol used. After it has determined the protocol type, it switches to either the POINT 3 or POINT 5 state. Of note, the POINT 4 protocol transmits three bytes all the time, except when the pointing device's middle button is pressed, which means that there is no way to detect the POINT 4 protocol until the middle button is activated. Thus, detection between the POINT 3 and POINT 4 protocols is placed within the code handling the POINT 3 state.

Figure 6:
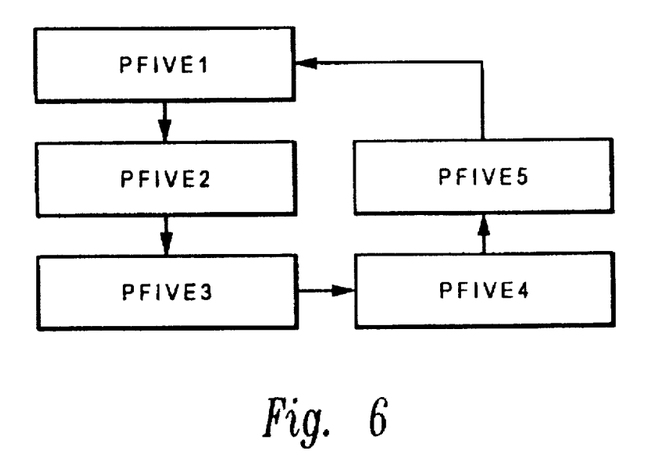
FIG. 6 illustrates a flow diagram of POINT 5 substrate according to FIG. 3.

FIG. 6 illustrates a flow diagram of POINT 5 substrate. POINT 5 protocol is eight bits, thus requiring no parity masking. The POINT 5 protocol consists of five bytes. The first byte contains five sentinel bits that are used for data stream synchronization and three-button status bits. The second two bytes consist of movement data, eight bits for X movement and eight bits for Y movement. The last two bytes consist of pointer movement during the transmission of the first three bytes, or eight bits of X movement and eight movement of Y movement. The data stream then stops until the pointer is moved again. The mouse system protocol sub-FSM begins at state PFIVE1, which processes the first byte received from the pointing device. A check is made that the upper bits match the expected signature pattern, for example, 10000xxx. If the upper bits match the expected signature pattern, the sub-FSM moves to the PFIVE2 state. If there is a mismatch of the expected signature pattern, the sub-FSM stays in the PFIVE1 state, but does increment a "probation" counter, which is discussed in greater detail below.

With each received byte, the sub-FSM moves to the next indicated state. At this point, the protocol fails to incorporate any sentinel bits, so it is unable to detect any synchronization errors until the next PFIVE1 state. At the end of the PFIVE5 state, an operating-system-dependent pointer movement report is prepared and dispatched to the operating system. The sub-FSM then returns to state PFIVE1 to wait for the next pointer report.

The signs of the second set of movement data, comprising bytes 4 and 5, may be sign compared to the first set of movement data, comprising bytes 2 and 3, respectively, as a further sanity check, but this does not immediately signify an out-of-sync condition as this could be caused by the user violently moving the pointer first one direction and then suddenly reversing directions. The detection routine described below directly supports this additional check and caveat by judicious choosing of the "probationary" increment to associate with a sign mismatch.

Figure 7:
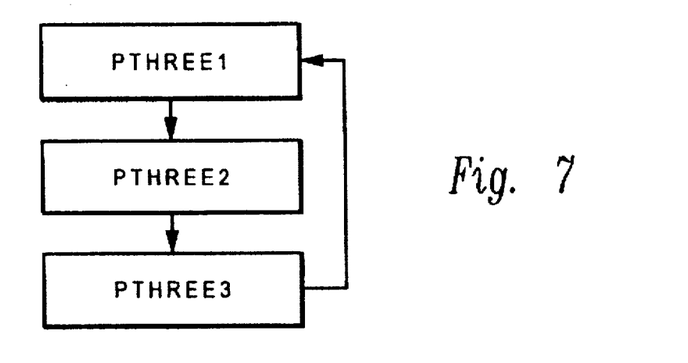
FIG. 7 illustrates a block diagram of the 3-byte protocol sub-FSM according to the present invention.

FIG. 7 illustrates a block diagram of the Microsoft 3-byte protocol sub-FSM according to the present invention, along with Table 1 showing the byte state and each bit and each byte. The Microsoft 3-byte protocol sub-FSM begins at a state PTHREE1, which processes the first byte from the pointing device. This protocol contains a single sentinel bit in each of the three packet bytes. This bit is in position 6 in all the bytes and is a binary 1 in the first byte and a binary 0 in the two subsequent bytes. This is a 7-E-1 protocol, so there are only seven valid bits per byte.

The first byte contains the sentinel bit, two bits to describe the left and right button states, the two high-order bits of the X movement value, and the two high-order bits of the Y movement value. The second byte contains the lower six bits of the X movement, and the third byte contains the lower six bits of Y movement, all shown in Table 1.

TABLE 1

| Byte | | | | | | | |
|---|---|---|---|---|---|---|---|
| 1 | 1 | L | R | Y7 | Y6 | X7 | X6 |
| 2 | 0 | X5 | X4 | X3 | X2 | X1 | X0 |
| 3 | 0 | Y5 | Y4 | Y3 | Y2 | Y1 | Y0 |

The sub-FSM associated with this Microsoft 3-byte protocol makes a cursory check that the three sentinel bits, one per byte, matches the expected value. If they match, the sub-FSM progresses to the next state. A movement report is then sent to the operating system when the sub-FSM reaches the PTHREE3 state. If an error is detected, the current report is thrown away, and the sub-FSM resets to the PTHREE1 state and then the probationary counter is incremented.

Figure 8:
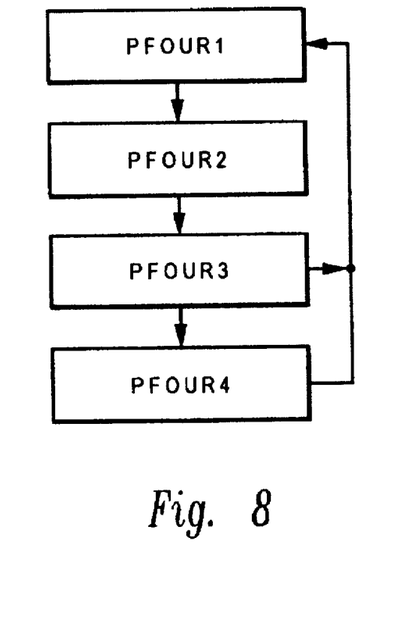
FIG. 8 illustrates a block diagram of the Logitech ¾-byte protocol.

FIG. 8 illustrates a block diagram of the Logitech ¾-byte protocol along with the communication protocol being shown in Table 2.

TABLE 2

| Byte | | | | | | | |
|---|---|---|---|---|---|---|---|
| 1 | 1 | L | R | Y7 | Y6 | X7 | X6 |
| 2 | 0 | X5 | X4 | X3 | X2 | X1 | X0 |
| 3 | 0 | Y5 | Y4 | Y3 | Y2 | Y1 | Y0 |
| 4 | 0 | M | D4 | D3 | D2 | D1 | D0 |

The Logitech ¾-byte protocol is nearly identical to the Microsoft 3-byte protocol shown in FIG. 7. One difference between the Logitech ¾-byte protocol and the Microsoft 3-byte protocol is that in the Logitech protocol, if the middle button is pressed, a fourth byte is emitted following what would be the last byte of the Microsoft format.

During initial selection, the sub-FSM is in the PFOUR3 substate and the driver does not know whether a fourth byte will be received or not. Accordingly, there are two options for the device driver protocol in this scenario. The first choice is to wait for a fourth byte, while the second choice is to dispatch to the operating system the mouse event it currently has. In the preferred embodiment, the protocol sends the event once the first three buttons are received; if a fourth byte is received, indicating a middle button event, the protocol sends an additional event that has only the button event within it, or in other words, no associated movement of the pointer.

Figure 9:
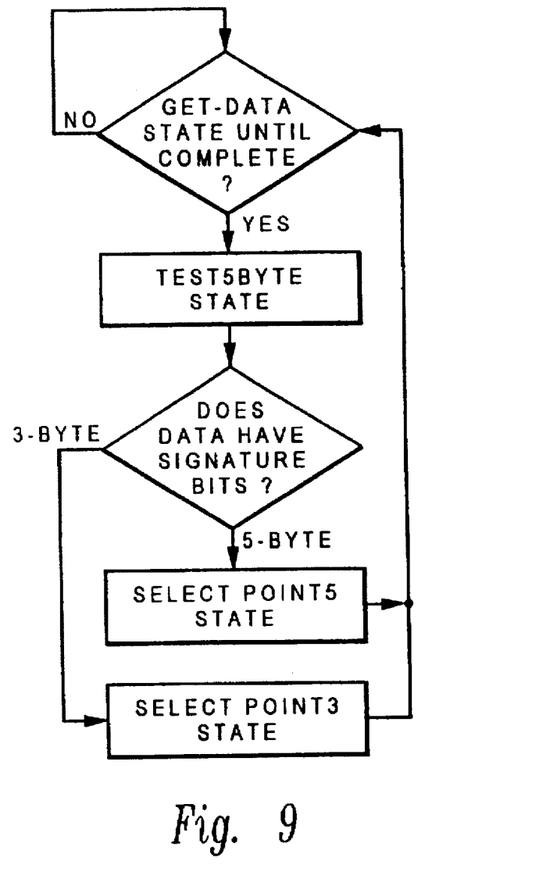
FIG. 9 is a flow diagram of the implementation of the protocol probation.

FIG. 9 is a flow diagram of the implementation of the protocol probation. The selected sub-FSMs keep track of the detected errors. These errors can be caused by transport layer problems, such as a bug in a particular serial port UART chip, that causes them to drop received bytes of data, or can be caused by reconfiguration of the pointing device, such as by either hot-plugging another type of pointer into the port, hot-plugging the same pointer causing it to revert to its default protocol type, or by flipping a switch on the pointer that causes it to switch protocols. The universal autodetection and selection protocol must allow for quick recovery of protocol synchronization transport layers, but also be prevented from being too quick to decide if it needs to redetermine the pointing device protocol.

To implement a solution, a probation state that maintains the currently detected protocol is selected, but accumulates error counts. When a complete, perfectly formed packet from the pointer is received, the probationary count load is cleared. If the probation level exceeds a given threshold, the main FSM is put into the DEVUNK state so that the protocol can be redetermined.

Figure 10:
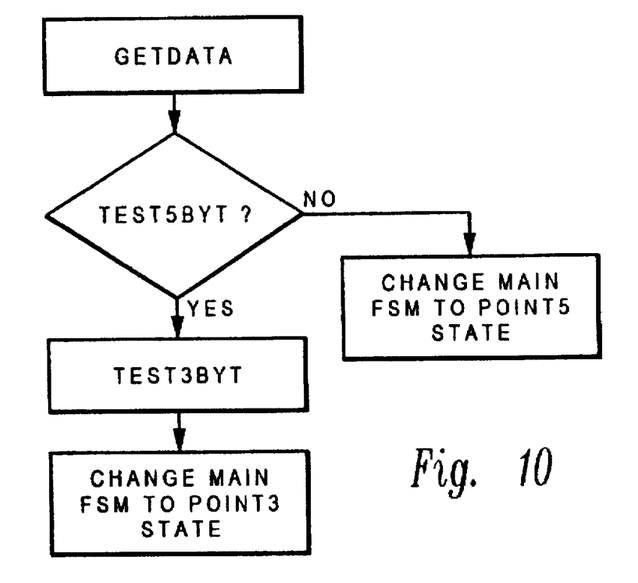
FIG. 10 depicts a flow chart of the sub-FSM protocol for the protocol detection subsection.

FIG. 10 depicts a flow chart of the sub-FSM protocol for the protocol detection subsection. First, the protocol is in a get-data state until 16 bytes have been collected. Sixteen bytes allow for at least two complete 5-byte protocol packets to be collected or four complete 3-byte protocol packets to be completed. Next, the protocol enters the test5byte state. While in the test5byte state, the device driver determines for every byte of collected data, first, if the byte of data has the 5-byte signature bits. If so, the system then determines if the byte received five bytes later matches. If so, the driver declares it is the 5-byte protocol and switches the main FSM to POINT 5 state, else it switches to the test3byte state.

For the test3byte state the system determines first if the byte of data has the 3-byte signature bit. If so, the system then determines if the next two bytes have the high-bit reset. If so, the system then declares the 3-byte protocol and switches the main FSM to the POINT 3 state. Once the test3byte state has been completed, the system switches back to the get-data state.

One might attempt to check the presence of the 5-byte protocol by examining the signature bits while masking off the lower button status bits. Unfortunately, this process results in frequently malfunctioning code. In this approach, the value returned from the pointer would then be AND with F8h, or binary 11111000. Thus, any value from ADh to AD7h might be interpreted as a valid signature, which could correspond to large amounts of movement in the left or down direction (ADh=−128 and A7h=−121). Since counts smaller than −128 are rounded to −128, this value occurs frequently in movement data bytes in the 3-byte protocol.

If the driver is connected to a 3-byte protocol mouse, but is looking to test for the presence of a 5-byte protocol mouse, the situation is even worse. The second and third bytes of the 3-byte protocol contain data of the binary form p0dddddd, where small p is the parity bit and the small d's represent the six data bits. One can see that any movement value that has 0000000 through 0000111 in the lower six bits, of an 8-bit total, and that generates the correct parity bits can be misinterpreted as the beginning of a 5-byte protocol packet. There are actually 16 possible movement values that can be misinterpreted out of 256 combinations. This leads to a 1-in-16 chance of error. Since two out of the three protocol bytes exhibit this property, there is a one in a chance, nearly 13%, of false positives on the 5-byte detection. To account for this problem, one assumption is that the button state does not change between reports, since there are typically 50-to-100 reports a second and the human reaction time being rather slow in changing button states between any two report packets. Because of this, the solution saves the alleged first byte of a 5-byte protocol packet and compares it against the alleged first byte of the second 5-byte protocol packet. If they match, the system then is reasonably certain that it does indeed have a 5-byte protocol mouse for the following reasons. The line in Table 3 shows the intersection of potential 5-byte first bytes indicated with asterisks and positions of potential false-positives on the second first 5-byte packet byte with X's.

TABLE 3

| * | * | * | * | * | * |
|---|---|---|---|---|---|
| 1 2 3 | 1 2 3 | 1 2 3 | 1 2 3 | 1 2 3 | 1 2 3 1 2 3 1 2 3 |
| X | | X | | | |

In the above example in Table 3, the first and second portions are impossible because the first byte of the 3-byte protocol always has a bit set that precludes it from matching the 5-byte protocol signature mask. Accordingly, there is the chance of a false 5-byte positive has been reduced to roughly 1%.

As indicated above, aspects of this invention pertain to specific "method functions" implementable on computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writable storage media (e.g. read only memory devices within a computer such as ROM 58 or CD-ROM disks 78 readable by a computer I/O attachment); (b) information alterably stored on writable storage media (e.g. floppy disks 74 and hard drives 72); or (c) information conveyed to a computer through communication media, such as network 94, and telephone networks, via modem 92. It should be understood, therefore, that such media, when carrying computer readable instructions that direct the method functions of the present invention, represent alternate embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. In a computer system having a data store, a main processing unit, data input and output means, and a pointing device, means for selecting a proper protocol for said pointing device, comprising:

means, coupled to said pointing device, for analyzing a data stream from said pointing device, said data stream resulting from actuation of said pointing device;

means, coupled to said analyzing means, for determining a protocol based on said analyzed data stream;

means, coupled to said determining means, for selecting a device state from a plurality of device states for enabling said pointing device to operate in said computer system.

2. The invention according to claim 1 wherein said plurality of device states includes a point 3 state for a two-button pointing device.

3. The invention according to claim 1 wherein said plurality of device states includes a point 4 state for a three-button pointing device.

4. The invention according to claim 3 wherein said point 4 state is determined by the action of a third button on said pointing device.

5. The invention according to claim 1 wherein said plurality of device states includes a point 5 state.

6. The invention according to claim 1 wherein said analyzing means further includes:

means for determining a probation state to prevent a protocol change in the event of detected errors that do not require a protocol change for said pointing device.

7. A computer program product for use in a computer system having a data store, a main processing unit, data input and output means, and a pointing device, said computer program product having computer usable code means for selecting a proper protocol for said pointing device, comprising:

computer usable code means for analyzing a data stream from said pointing device, said data stream resulting from actuation of said pointing device;

computer usable code means for determining a protocol based on said analyzed data stream;

computer usable code means for selecting a device state based on said protocol from a plurality of device states for enabling said pointing device to operate in said computer system.

8. The invention according to claim 7 wherein said plurality of device states includes a point 3 state for a two-button pointing device.

9. The invention according to claim 7 wherein said plurality of device states includes a point 4 state for a three-button pointing device.

10. The invention according to claim 9 wherein said point 4 state is determined by the action of a third button on said pointing device.

11. The invention according to claim 7 wherein said plurality of device states includes a point 5 state.

12. The invention according to claim 7 wherein said analyzing code means further includes:

computer code means for determining a probation state to prevent a protocol change in the event of detected errors that do not require a protocol change for said pointing device.

13. A method for selecting a proper protocol for a pointing device within a computer system having a data store, a main processing unit, data input and output means, comprising:

analyzing a data stream from said pointing device, said data stream resulting from actuation of said pointing device;

determining a protocol based on said analyzed data stream;

selecting a device state based on said protocol from a plurality of device states for enabling said pointing device to operate in said computer system.

14. The invention according to claim 13 wherein said plurality of device states includes a point 3 state for a two-button pointing device.

15. The invention according to claim 13 wherein said plurality of device states includes a point 4 state for a three-button pointing device.

16. The invention according to claim 15 wherein said point 4 state is determined by the action of a third button on said pointing device.

17. The invention according to claim 13 wherein said plurality of device states includes a point 5 state.

18. The invention according to claim 13 wherein said analyzing step further comprises:

determining a probation state to prevent a protocol change in the event of detected errors that do not require a protocol change for said pointing device.

* * * * *